May 31, 1932.  A. REDLER  1,860,952
CONVEYER
Filed March 18, 1929  3 Sheets-Sheet 1
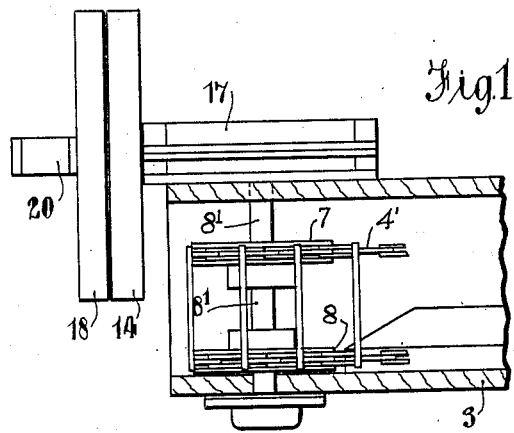
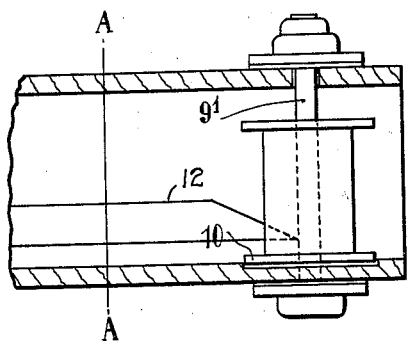
Fig. 1.
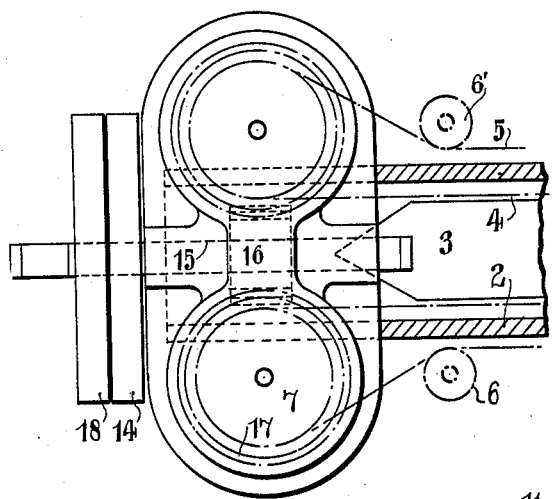
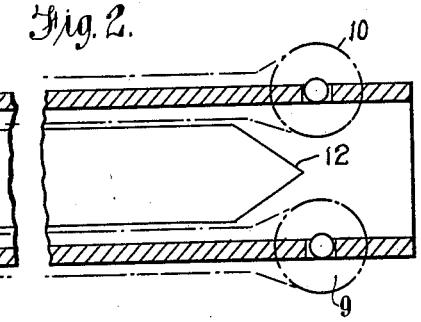
Fig. 2.
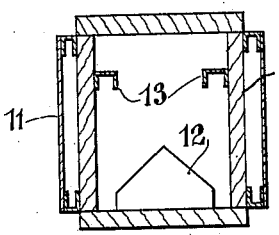
Fig. 3.
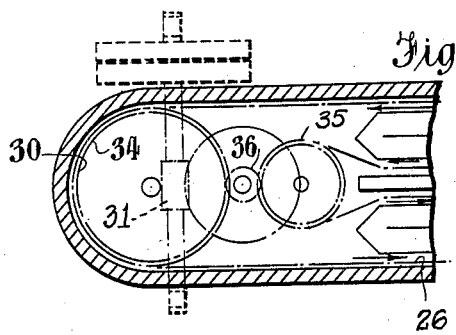
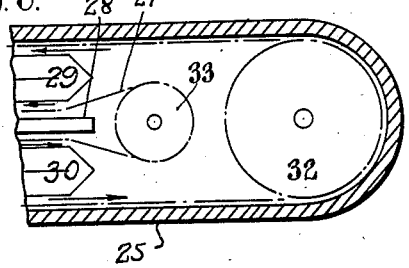
Fig. 8.
Inventor
ARNOLD REDLER,
BY Toulmin & Toulmin
Attorneys

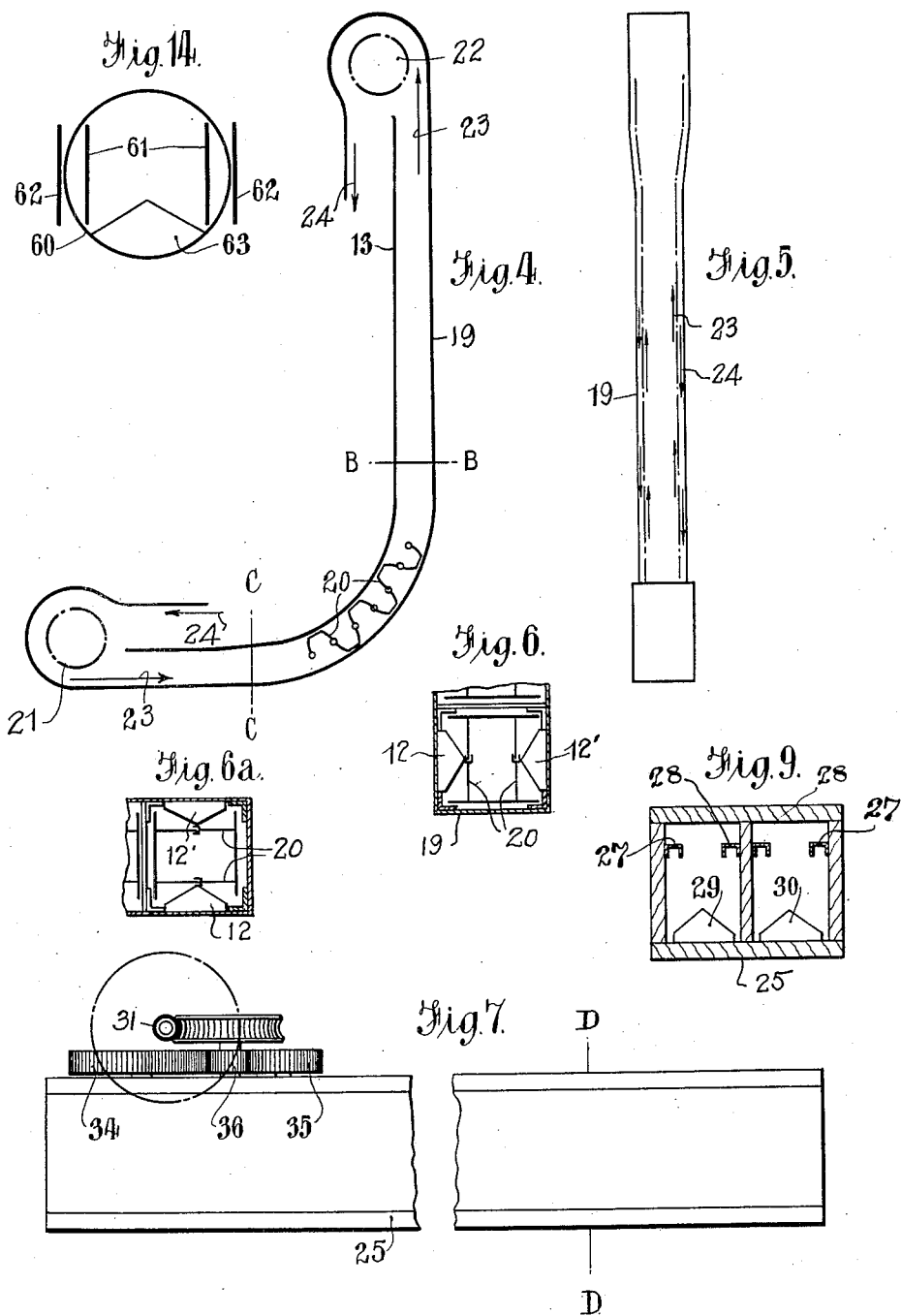

May 31, 1932.  A. REDLER  1,860,952
CONVEYER
Filed March 18, 1929   3 Sheets-Sheet 3
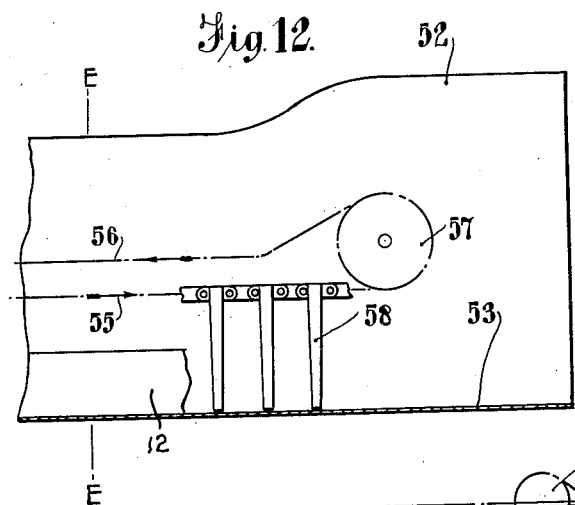
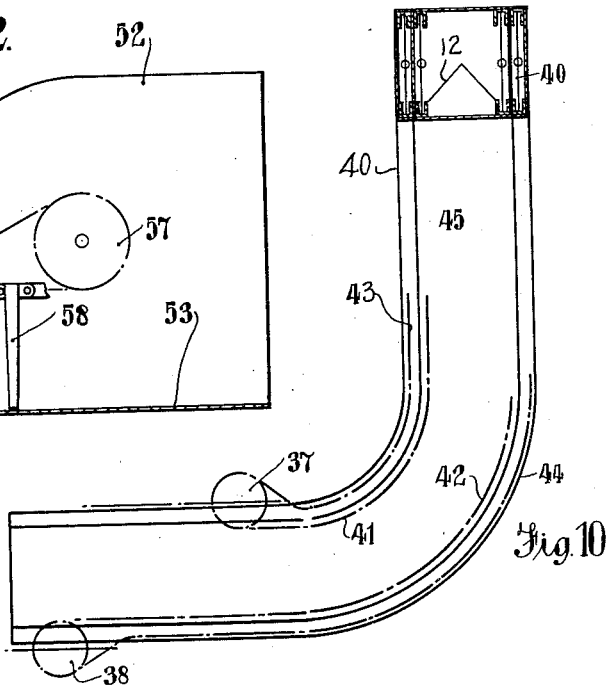
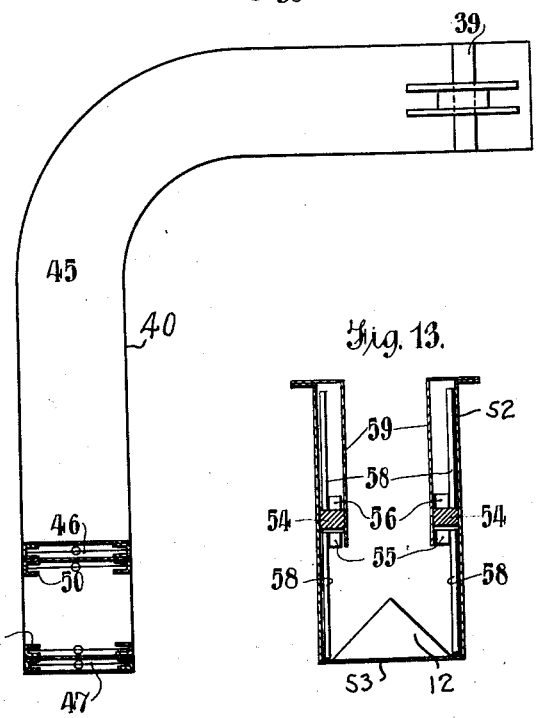
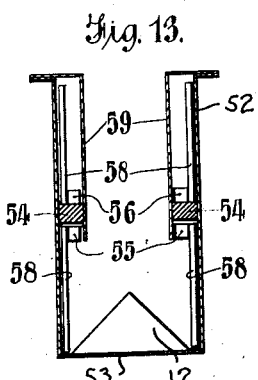
Inventor
ARNOLD REDLER,
By
Toulmin & Toulmin
Attorneys Patented May 31, 1932

1,860,952

UNITED STATES PATENT OFFICE

ARNOLD REDLER, OF FLOUR MILLS, SHARPNESS DOCKS, ENGLAND, ASSIGNOR TO RED-LER CONVEYOR COMPANY, OF QUINCY, MASSACHUSETTS, A CORPORATION OF MASSA-CHUSETTS

CONVEYER

Application filed March 18, 1929, Serial No. 347,895, and in Great Britain March 29, 1928.

This invention relates to conveyers and more particularly to conveyers adapted to transport comminuted material in bulk having conveying devices which engage frictionally at the sides with the material being transported.

The invention has for its object generally, an improved construction for conveyers which is efficient, economical and readily manufactured.

More specifically, it is an object of the present invention to provide conveyers of the character indicated with means for increasing the frictional engagement between the conveying devices and the material transported, whereby the operating efficiency of such conveyers is materially increased.

A still further object is to provide conveyers of the character indicated with simple and rugged means that may be used with substantially any type of conveyer conduit for utilizing the force of gravity to increase frictional engagement between the conveying devices in the conduit and the material being transported.

Other objects of the invention will in part be obvious and will in part appear hereinafter.

The invention accordingly comprises the features of construction, combination of elements, and arrangement of parts, which will be exemplified in the construction hereinafter set forth and the scope of the application of which will be indicated in the claims.

For a fuller understanding of the nature and objects of the invention, reference should be had to the following detailed description taken in connection with the accompanying drawings, in which:

Fig. 1 is a vertical sectional view, certain parts being broken away, others being shown in elevation, showing a conveyer constructed in accordance with the invention;

Fig. 2 is a view partly in horizontal section and partly in plan showing the conveyer illustrated in Fig. 1;

Fig. 3 is a cross section taken on the line A—A of Fig. 1;

Fig. 4 illustrates conventionally a modified form of conveyer constructed in accordance with the invention;

Fig. 5 is an end elevation of the conveyer shown in Fig. 4;

Figs. 6 and 6a show cross sections of the conveyer illustrated in Fig. 4 taken respectively on the lines B—B and C—C of Fig. 4;

Fig. 7 is a side elevation showing a further modified form of conveyer, certain parts being shown conventionally;

Fig. 8 is a horizontal sectional view of the conveyer shown in Fig. 7;

Fig. 9 is a cross sectional view taken on the line D—D of Fig. 7;

Fig. 10 is a conventional view illustrating in detail a preferred manner of constructing a double elbow in a conveyer of the present invention;

Fig. 11 shows similarly the upper bend of the conveyer of Fig. 10;

Fig. 12 is a fragmentary view illustrating an end construction in a further modified form of the present invention;

Fig. 13 is a cross section taken on the line E—E of Fig. 12; and

Fig. 14 illustrates diagrammatically the application of the present invention to a conveyer conduit of circular cross section.

Referring now to the drawings, and particularly to Figs. 1, 2 and 3, a conveyer conduit is shown having sides 2 and a bottom 3, in which conveying devices are arranged to sweep the sides while traveling in the same direction. These conveying devices may be of any suitable variety having flights or crossbars, which engage frictionally with the material being transported, for example conveyer chains or bands. A suitable conveyer chain is indicated generally at 4, the outside return portions being shown at 5. Such chain may be of the link variety, as shown, comprising sidebars 4' and crossbars 4". In Fig. 1 a pair of such chains is employed, one at each side of the conveyer conduits, the chains being driven by suitable sprockets, for example, as shown where upper and lower wheels 7 and 8 are employed, mounted on driven shafts 8'. Idler sprockets for the chains are shown at 9 and 10 at the other end of the conduit and tensioning sprockets at 6 and 6' for taking up the slack in the return portion 5 of the chains 4. The return portions of the conduit may be protected if desired by providing enclosing shields, shown at 11 in Fig. 3, on the outside of the conduit. These shields are seen also to serve as guides for the exterior runs. To keep the inside portions of the chains 4 in place, interior guides are provided, as shown at 13.

In order to provide the conduit of the present invention with means for increasing the frictional engagement between the material transported and the conveyer chain, an elongated pyramidal member 12 or structure having sloping roof-like sides is disposed between the chains 4 centrally along the bottom of the conveyer conduit, so that the material being transported on the sloping sides may be under the influence of the force of gravity and so drawn into tighter frictional engagement with the chains. While this means has been shown as having plain sides and a central linear ridge, it is obvious that the shape of the ridge and the slope of the sides may be altered or modified to provide any desired path and distribution of the side thrust of the material being transported against the conveyer chains.

While any suitable means for actuating the driving shafts 8' may be employed, for general service, a worm drive may with advantage, be utilized and provided as an original part of the conveyer conduit, as shown in Figs. 1 and 2; here 14 denotes a belt-driven pulley having a driven shaft 15 provided with a worm 16 that engages with worm wheels 17 on the shafts 8'. The shaft 15 also preferably has an idler pulley 18 to which the driving belt may be shifted when it is desired to stop the operation of the conveyer.

In operation, the material to be transported is discharged into the conveyer conduit at a suitable point when it will be drawn down the sides of member 12 against the forward runs of chains 4 and engage frictionally therewith, whereby it is readily transported by the chains to a suitable point of discharge.

Referring now to Figs. 4, 5, 6 and 6a, a conveyer is shown in which the conveying devices, sweeping the sides of the conveyer conduit, are not separate chains but transversely separated crossbars carried by a single chain which is constructed to have sidebars extending across the full width of the conveyer conduit carrying the crossbars. Here a conduit 19 of rectangular cross-section is shown having sides provided with pyramidal members 12 and 12' disposed along the central portions thereof and U-shaped links 20, of the character shown in my prior British Patent No. 315,774 where the tips of the U's are articulated, the bases extending in opposite directions and carrying crossbars. These bars preferably have their ends extended as indicated in Figs. 6 and 6a so as to be guided against the conduit sides by the grooves at the sides of members 12 and 12'.

The movement of the chain within the conduit 19 is effected by means of sprockets disposed in the ends of the conduit which are here depicted conventionally at 21 and 22. The direction of motion of the chain in the conduit for elevating material in bulk is shown by arrows 23, the direction of motion of the return run on the outside of the conduit being indicated by the arrows 24.

Referring to Figs. 7, 8 and 9, a conveyer is shown having a conduit 25 provided with closed ends and having conveyer chains or belts entirely enclosed therein. Here an endless chain 26 is arranged to travel entirely around the inside of the enclosing wall of the conduit. A second endless chain 27 is disposed to travel entirely around a partition 28 that divides the conduit 25 into two channels in each of which is disposed pyramidal members in accordance with the invention, the members being here shown respectively at 29 and 30. Driving sprockets for the chains 26 and 27 are shown respectively at 34 and 35, while idler sprockets are shown respectively at 32 and 33.

Suitable power connections for actuating the sprockets 34 and 35 in unison are provided which may be of any suitable variety, for example a pulley for belt connections, as here indicated conventionally in broken lines for driving a worm 31, which worm engages with a worm wheel on the shaft driving pinion 36 that is in driving engagement with both sprockets 34 and 35. While sprockets 34 and 35 are here shown as proportioned to produce a speed differential in the travel of chains 26 and 27, it will be understood that various other arrangements are equally applicable to the practice of this form of the invention.

Referring to Figs. 10 and 11, an arrangement is shown for conveyers of the present invention adapted for making a double elbow turn. Here a rectangular conduit 45 is provided with conveyer chains 46 and 47 disposed to sweep the sides of the conduit, such chains being here depicted as of the single cable variety and arranged to traverse sprockets 37 and 38 at the lower end of the conduit and sprockets 39 at the upper end, either or both sets being adapted to perform a driving function, when desired.

The conveyer chains 46 and 47 are shown as having forward runs 41 and 42 passing up to and around sprockets 39 when elevating material, the return runs 43 and 44 following the outside of the conveyer walls, shields being preferably provided therefor as shown at 40. Guides for the chains may also be provided on the interior of the conduit as shown at 50 and 51. It will be understood, however, that, while an arrangement for accomplishing a double elbow turn in conveyors of the present invention is here shown, the arrangement is not so limited and may be extended to any number of turns.

Referring to Figs. 12 and 13, an arrangement is shown for accomplishing the return of a run of chain, which sweeps the sides of a conveyer of the present invention, in a manner that does not involve traversing an outside wall. Here an open conveyer conduit or trough 52 has a bottom 53 provided with a centrally disposed pyramidal member 12 and lateral guides 54 below and above which travel the articulated link work of the chains which are here provided to sweep the sides. The forward run is here shown at 55 and the return run at 56, the link work being arranged to engage with a sprocket 57 in order to bend back on itself and provide the return run. This link work has transversely extending arms or bars 58 which depend down across the portion of the sides below the guides 54 and extend upwardly therefrom for the return runs. Shields 59 are provided for the arms of the return runs so that there is no interference therefrom in effecting the transport of material in bulk by the conveyer, such material being fed into the trough at a suitable point and gravitating to the bottom to be thrust to the sides by member 12.

Fig. 14 illustrates diagrammatically how a conduit having a circular cross-section may be arranged to utilize flat conveyer chains to draw along material in bulk in accordance with the present invention. Here a conduit 60 has forward runs 61 of two conveyer chains, for example of the single cable variety, disposed oppositely and traveling in the same direction on opposite sides of the conduit. Return runs 62 follow the outside and a pyramidal member 63 is disposed along the conduit centrally between the inside runs.

While conveyers of the present invention are adapted to function as conveying units in themselves, it will be readily understood that they may be incorporated in or arranged to function in conjunction with other material handling devices, for example, in conjunction with a delivery assisting device as shown and described in my British Patent No. 263,501, or a feed regulating device as shown and described in my British Patent No. 243,552.

Since certain changes may be made in the above construction and different embodiments of the invention could be made without departing from the scope thereof, it is intended that all matter contained in the above description or shown in the accompanying drawings, shall be interpreted as illustrative and not in a limiting sense.

Having described my invention, what I claim as new and desire to secure by Letters Patent, is:

1. A conveying device adapted for conveying comminuted material in bulk, comprising a conveyer conduit having a portion disposed mainly horizontal and formed with sides and a bottom, side sweeping conveying devices within said conduit, said runs being arranged to engage frictionally with the material being transported, and a pyramidal member disposed along said bottom and adapted to increase the frictional engagement between said side sweeping devices and the material being transported.

2. A conveying device adapted for conveying comminuted material in bulk, comprising a conveyer conduit having a portion disposed mainly horizontal and formed with sides and a bottom, side sweeping conveyer chains disposed to move in the same direction within said conduit and adapted to draw frictionally upon the sides of the material being transported, and a pyramidal member associated with the bottom of said conduit adapted to increase the frictional engagement between said conveyer chains and the material being transported.

3. A conveying device adapted for conveying comminuted material in bulk, comprising a conveyer conduit having a portion disposed mainly horizontal and formed with sides and a bottom, said bottom having a central upstanding ridge provided with sloping sides forming grooves at the side edges along said bottom, and side sweeping conveying devices provided with transversely extending members extending into and moving along said grooves in the same direction at each side of said ridge, whereby the bulk of material being transported is drawn into a relatively high degree of frictional engagement with said transversely extending members.

4. A conveying device adapted for conveying comminuted material in bulk, comprising a conveyer conduit having a portion disposed mainly horizontal and formed with sides and a bottom, said bottom being provided with a central upstanding ridge having sloping sides and forming grooves at the side edges of said conduit, and a conveyer chain moving in said conduit having transversely extending members adapted to sweep the sides of said conduit and to engage frictionally with the material in said conduit to be transported.

5. A conveying device adapted for conveying comminuted material in bulk, comprising a conveyer conduit having a portion disposed mainly horizontal and formed with sides and a bottom, said bottom being formed with a centrally disposed longitudinally extending pyramidal member and having grooves at its side edges between the pyramidal formation and the sides of said conduit, and a conveyer chain moving in said conduit having transversely extending members extending into said grooves and adapted to be engaged frictionally by the material being transported.

6. A conveying device adapted for conveying comminuted material in bulk, comprising a conveyer conduit having a portion disposed mainly horizontal and formed with sides and a bottom, said bottom being formed with a centrally disposed longitudinally extending pyramidal member and having grooves at its side edges between the pyramidal formation and the sides of said conduit, endless conveyer chains disposed in said conduit having interior runs disposed one at each side of said pyramidal member, and driving means on said conduit for simultaneously moving both of said interior runs.

7. A conveying device adapted for conveying comminuted material in bulk, comprising a conveyer conduit having a portion disposed mainly horizontal and formed with sides and a bottom, said bottom being formed with a centrally disposed longitudinally extending pyramidal member and having grooves at its side edges between the pyramidal formation and the sides of said conduit, endless conveyer chains disposed in said conduit having interior runs at each side of said pyramidal member and exterior runs on the outside of said conduit sides, means for moving said inside runs in the same direction at each side of said pyramidal member, and guiding means associated with said conduit for said outside runs.

8. A conveying device adapted for conveying comminuted material in bulk, comprising a conveyer conduit having a portion disposed mainly horizontal and formed with sides and a bottom, said bottom being formed with a centrally disposed longitudinally extending pyramidal member and having grooves at its side edges between the pyramidal formation and the sides of said conduit, a pair of endless conveyer chains disposed in said conduit having interior runs, one at each side of said pyramidal member, means for moving said runs in the same direction within said conduit, said chains each having transversely extending members sweeping said sides and arranged to be guided by the grooves at the side edges of said pyramidal member, and having return runs traversing the outside of said conduit sides, and shields on said conduit for protecting said outside runs.

9. A conveying device adapted for conveying comminuted material in bulk, comprising a conveyer conduit having a portion formed with sides and a bottom having grooves at its side edges, endless conveyer chains having cross-bars spanning said sides and portions working in said grooves, the interior runs being disposed one at each side of said conduit, and driving means on said conduit for simultaneously moving both of said interior runs.

10. A conveying device adapted for conveying comminuted material in bulk, comprising a conveyer conduit having a portion formed with sides and a bottom having grooves at its side edges at the sides of said conduit, endless conveyer chains having cross-bars spanning said sides and portions working in said grooves, the interior runs being at each side of said conduit and exterior runs on the outside, means for moving said inside runs in the same direction at each side of said conduit, and guiding means associated with said conduit for said outside runs.

11. A conveying device adapted for conveying comminuted material in bulk, comprising a conveyer conduit having a portion disposed mainly horizontal and formed with sides and a bottom having grooves at its side edges at the sides of said conduit, a pair of endless conveyer chains disposed in said conduit having interior runs, one at each side of said bottom, means for moving said runs in the same direction within said conduit, said chains each having transversely extending members sweeping said sides arranged to be guided by the grooves at the side edges of said bottom, and having return runs traversing the outside of said conduit sides, and shields on said conduit for protecting said outside runs.

12. A conveying device adapted for conveying comminuted material in bulk, comprising a conveyer conduit having a portion formed with sides and a bottom provided with tracking means at its side edges, endless conveyer members disposed partly within and partly without said conduit disposed about opposite sides and arranged to sweep the same, said members having marginal portions engaging with said tracking means, and driving means associated with said conduit for simultaneously moving the interior portions of said conveyer members.

In testimony whereof I affix my signature.

ARNOLD REDLER.